(12) United States Patent
Crook et al.

(10) Patent No.: US 6,983,360 B2
(45) Date of Patent: Jan. 3, 2006

(54) PROGRAM LOADING MECHANISM THROUGH A SINGLE INPUT DATA PATH

(75) Inventors: Neal Andrew Crook, Reading (GB); James Peterson, Portland, OR (US)

(73) Assignee: Micron Technology, Inc., Boise, ID (US)

(*) Notice: Subject to any disclaimer, the term of this patent is extended or adjusted under 35 U.S.C. 154(b) by 737 days.

(21) Appl. No.: 09/943,586

(22) Filed: Aug. 30, 2001

(65) Prior Publication Data

US 2003/0046523 A1 Mar. 6, 2003

(51) Int. Cl.
*G06F 9/445* (2006.01)
*G06F 9/24* (2006.01)
(52) U.S. Cl. .................. 712/229; 712/225; 712/227
(58) Field of Classification Search .............. 712/225, 712/227, 229; 717/177, 178; 709/221, 222; 710/10, 14; 380/249
See application file for complete search history.

(56) References Cited

U.S. PATENT DOCUMENTS

| | | | | |
|---|---|---|---|---|
| 5,652,887 A | * | 7/1997 | Dewey et al. | 719/325 |
| 5,689,726 A | * | 11/1997 | Lin | 710/10 |
| 5,968,169 A | * | 10/1999 | Pickett | 712/239 |
| 6,110,229 A | * | 8/2000 | Yamaguchi | 717/178 |
| 6,324,691 B1 | * | 11/2001 | Gazdik | 717/178 |

* cited by examiner

*Primary Examiner*—Daniel H. Pan
(74) *Attorney, Agent, or Firm*—Fish & Neave IP Group of Ropes & Gray LLP; Evelyn C. Mak

(57) ABSTRACT

Pieces of input data, which can be either setup data or program data with an associated identifier, are provided to a processing engine through a single input data path. After a system initially resets, the processing engine runs in setup mode. When an identifier for setup data is detected, input data is passed unchanged through an execution pipeline to control logic, which executes a setup program. The setup program loads a program counter, a memory, a register file counter, and a register file. When an identifier for program data is detected, the processing engine automatically switches to run mode and input data is processed in the execution pipeline. The processing engine automatically switches between run mode and setup mode depending on the identifier. Using a single input data path decreases hardware complexity and allows input data to be processed without external control logic.

34 Claims, 4 Drawing Sheets

PROGRAM LOADING MECHANISM THROUGH A SINGLE INPUT DATA PATH

BACKGROUND OF THE INVENTION

This invention relates to the loading of program code, data, and control information into a processing engine. More particularly, this invention relates to loading program code, data, and control information into a processing engine through a single data path.

A processing engine processes input data to generate output data. A processing engine typically includes the following: a memory, a program counter, control logic, an execution pipeline, and a register file. The memory holds a stored program, which is a set of instructions stored in a block of memory. The program counter typically contains an address to an instruction in memory. After an instruction is read, the program counter is reloaded with the address of the next instruction to be read. Control logic decodes the current instruction, thereby controlling the execution pipeline. An instruction typically contains the following: one or more operands (e.g., contents of source registers or memory addresses, or constants), an operation code (e.g., add, subtract, multiply, shift, load, store, branch, etc.), and a destination register or memory address for a resulting value. The execution pipeline computes output data from input data by performing arithmetic and logic operations defined by the decoded instruction. Each operation is preferably processed in multiple stages (e.g., a fetch stage, a decode stage, an execute stage, and a write-back stage) such that, where possible, the different stages can be overlapped to increase throughput (i.e., the rate at which temporary values or partial results are computed by the execution pipeline). The register file typically holds temporary values or partial results computed by the execution pipeline. In addition, the register file can hold constants that are initialized before the program executes. The temporary values and constants can be changed from time to time during program execution.

Processing engines of a known class typically do not have the ability to perform random access of their input data. Instead, those engines can only access (or read) a next piece of data from the input data stream. If no data is available, such processing engines stall until data becomes available. Logically, the input data stream can be considered the output of a first-in-first-out (FIFO) system. The data positioned first in the input data stream is processed first. Successive sequences of input data may need to be processed by different programs or by using different sets of constants in the register file. However, the memory and register file are often too small to accommodate all possible programs and constants simultaneously. As a result, either the memory, register file, or both will need to be reloaded in preparation for each sequence of input data.

A typical sequence of operations required by known processing engines is shown in table (1).

TABLE (1)

| | |
|---|---|
| 1 | Load a program into Memory |
| 2 | Load constants into the Register File |
| 3 | Initialize the Program Counter |
| 4 | Supply an arbitrary number of pieces of input data |
| 5 | Wait for all of the input data to be processed |
| 6 | Load new constants into the Register File |
| 7 | Initialize the Program Counter |
| 8 | Supply an arbitrary number of pieces of input data |
| 9 | Wait for all of the input data to be processed |
| 10 | Load a new program into Memory |

TABLE (1)-continued

| | |
|---|---|
| 11 | Initialize the Program Counter |
| ... | ... |

Different data paths are used for initializing the system and executing a stored program. To ensure that a data stream has been processed to completion before loading a new program or a new set of constants, initialization must be synchronized by external control logic.

Known processing engines have several disadvantages. First, the use of multiple input data paths increases hardware complexity. Additional wiring and logic circuitry are needed. For example, multiplexers are needed to select whether initialization data or program data is to be sent to a register file. Also, multiple operations (e.g., run mode and setup mode) do not implement the same functions the same way. For example, the run mode (i.e., program mode) function of writing to a register file is typically different than the setup mode function of writing to a register file. In setup mode, an address is sent to a register file directly from an initialization path and a multiplexer. In run mode, an address is sent to the register file via control logic and the multiplexer. Second, the use of external control logic increases hardware and creates a dependency on an external source. External control logic is needed to synchronize the loading and execution of data through the multiple input data paths such that data is processed in the correct order at the appropriate time. The processing engine must function in the same timing domain as the external control logic—the processing engine cannot operate in a separate timing domain nor can data be supplied to it at a sporadic rate.

In view of the foregoing, it would be desirable to provide a processing engine with an efficient mechanism for loading program code, data, and control information.

It would also be desirable to provide a processing engine that allows a program to be processed with little or no external control logic.

SUMMARY OF THE INVENTION

It is an object of this invention to provide a processing engine with an efficient mechanism for loading program code, data, and control information.

It is another object of this invention to provide a processing engine that allows a program to be processed with little or no external control logic.

In accordance with this invention, a processing engine is presented with a single input data path. Program data and setup data are passed through the same input data path. To identify the input data as either setup data or program data, each piece of input data preferably contains one or more additional bits, known as identification bits.

The identification bits indicate whether the processing engine is in setup mode (associated with setup data) or run mode (associated with program data).

Initially after a reset, the processing engine typically runs in setup mode. In setup mode, control logic executes a setup program, which may make use of instructions and operations that are not typically available in run mode. In run mode, the processing engine executes instructions that are read from memory. When the input data changes from setup data to program data, the processing engine automatically switches from setup mode to run mode. Similarly, when the input data changes from program data to setup data, the processing engine automatically switches from run mode to setup mode. When input data is not available, the system enters a wait state in its current mode.

Input data is passed through a single input data path into an execution pipeline. A piece of input data identified as program data is processed in the execution pipeline under the control of the current instruction that has been read from memory. A piece of input data identified as setup data is propagated through the execution pipeline via execution of a pass-through instruction. When setup data reaches the output data bus, control logic generates appropriate control signals to load the data into appropriate storage locations. Setup data can be decoded further from either additional identification bits or some subset of the input data. Any additional information supplied with a piece of input data can be part of an instruction sequence of the setup program.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention provides a processing engine that loads program code, data, and control information through a single input data path.

Figure 1:
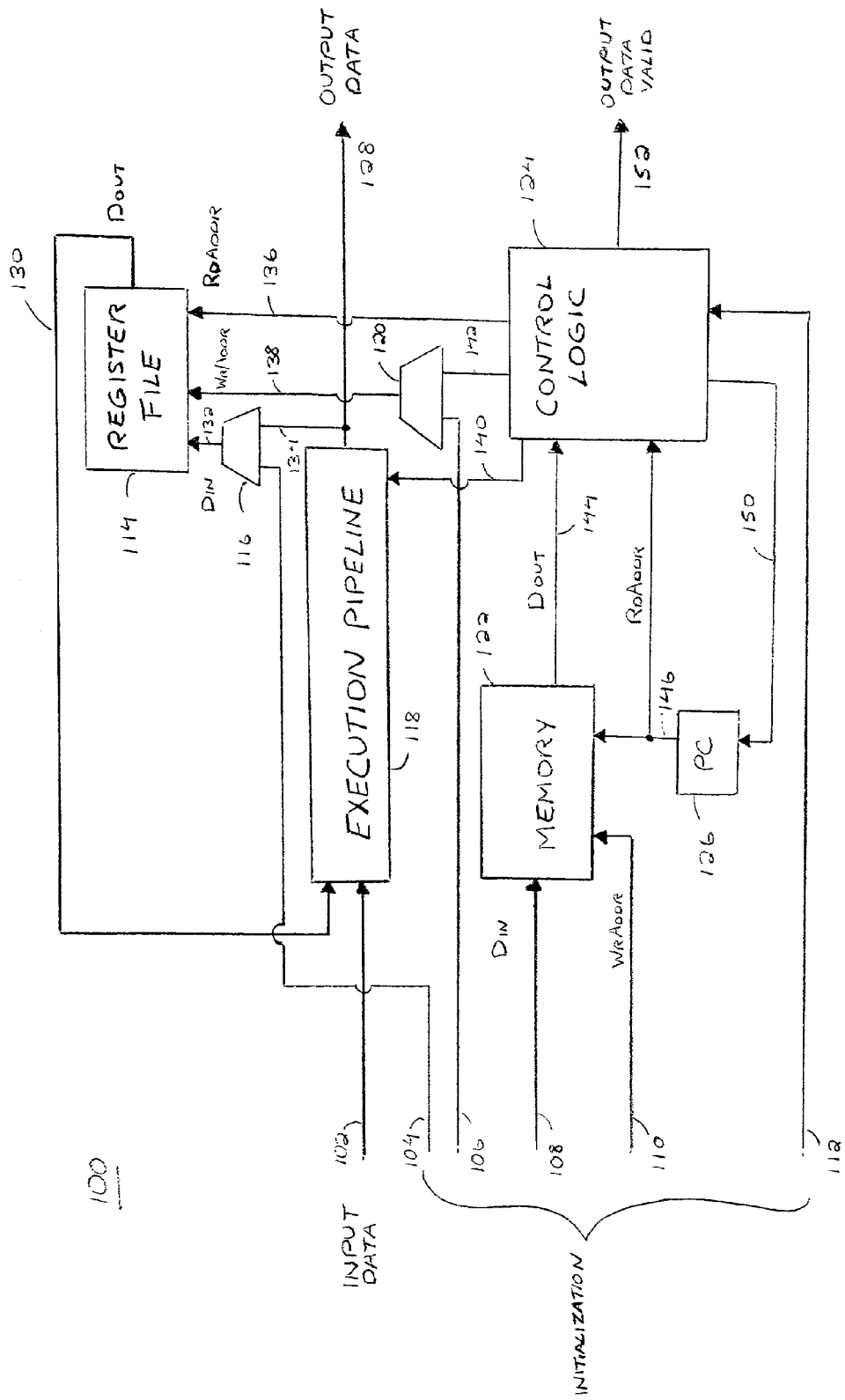
FIG. 1 is a block diagram of a known multiple input data path processing engine.

FIG. 1 shows a known multiple input data path processing engine 100 that has initialization paths 104, 106, 108, 110, and 112 for setup data and an input data path 102 for program data. These initialization paths are controlled by external control logic, which is not shown. A program can be loaded into a memory 122 via an initialization input data path ($D_{IN}$) 108 at an address specified from an initialization write address path ($W_R A_{DDR}$) 110. Program instructions are typically stored sequentially in a block of memory 122. Program execution can be started by loading a memory address of a first program instruction into a program counter (PC) 126 via initialization path 112, control logic 124, and path 150. Data (such as program constants) can be loaded into a register file 114 via initialization path 104, a multiplexer 116, and an input data path ($D_{IN}$) 132. An address of register file 114 to which data is to be written can be specified using initialization path 106, a multiplexer 120, and a write address path ($W_R A_{DDR}$) 138.

Once memory 122, register file 114, and program counter 126 are initialized, input data from path 102 is processed in an execution pipeline 118. An instruction is fetched from memory 122 at a current address of program counter 126 via path 146. This program counter value is also sent to control logic 124 via read address path ($R_D A_{DDR}$) 146. Control logic 124 generates a new program counter value (by incrementing the current value or by calculating a branch destination) and sends the new value to program counter 126 via path 150. The fetched instruction is sent to control logic 124 via output data path ($D_{OUT}$) 144, where the instruction is decoded to generate control signals for execution pipeline 118 via path 140. Control logic 124 can send a read address to register file 114 via a read address path ($R_D A_{DDR}$) 136. This may be used to read a register value for use in execution pipeline 118. Control logic 124 can also send a write address to register file 114 via a path 142, multiplexer 120, and write address path ($W_R A_{DDR}$) 138. This may be used to write an output from execution pipeline 118 into register file 114. Data from register file 114 can be sent to execution pipeline 118 via an output data path ($D_{OUT}$) 130. Once the instruction has been processed, its result can be sent to an output data path 128. Data path 128 is used to transfer processed data out of processing engine 100. When control logic 124 determines that the current instruction will generate a processed data output, it signals this using an output data valid signal 152. Data path 128 is also used to transfer temporary or partially-processed data to register file 114 via a path 134, multiplexer 116, and input data path ($D_{IN}$) 132.

Figure 2:
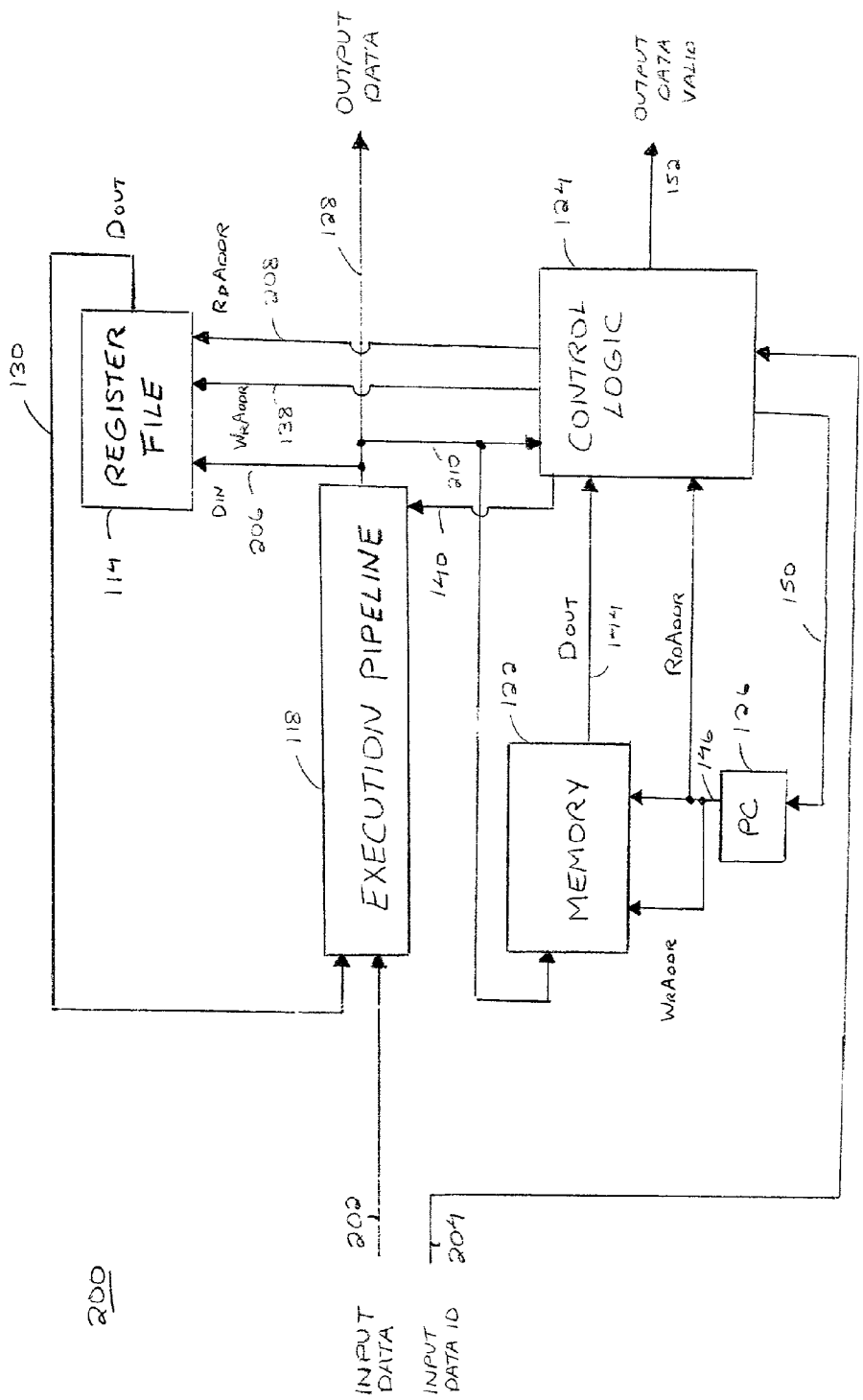
FIG. 2 is a block diagram of a single input data path processing engine in accordance with the present invention.

FIG. 2 shows a single input data path processing engine 200 in accordance with an embodiment of the present invention. Instead of an input data path for program data and a plurality of separate initialization paths for setup data as shown in FIG. 1, processing engine 200 uses a single input data path 202. Each piece of input data from input data path 202 includes additional identification bits. These additional identification bits are separated from the rest of the input data and transported along input data identification (ID) path 204. Although not shown, control logic can be used to read the identification bits (e.g., reading the most significant bits) and sending the identification bits to input data ID path 204. The identification bits may be one or more bits. They indicate whether a given piece of input data is setup data or program data, and may also contain other information related to that piece of input data.

When the identification bits indicate that data is program data, control logic 124 signals execution pipeline 118 via path 140 to process the next instruction of a stored program residing in memory 122 (via output data path ($D_{OUT}$) 144, control logic 124, and path 140). The instruction may be executed using any suitable pipelining method. Execution pipeline 118 continues to execute instructions from the stored program (which may include reading values from register file 114 or writing values to the output of processing engine 200 via output data path 128) until control logic 124 reads the identification bit(s) of the next piece of data. The identification bit(s) of the next piece of data determines what mode processing engine 200 will operate in next.

When the identification bits indicate that data is setup data, control logic 124 signals execution pipeline 118 via path 140 to execute a pass-through instruction. A pass-through instruction allows a piece of input data to propagate through to output data path 128 without modification. The setup data will be passed to output data path 128. Control logic 124 may perform additional decoding of the setup data either via path 204 or via path 210.

Register file 114 can be loaded with setup data or program data. In both cases, register file 114 receives input data directly from output data path 128 via input data path ($D_{IN}$) 206. A register file 114 address to which input data can be written is sent from control logic 124 via write address path ($W_R A_{DDR}$) 138. Data in register file 114 can be read under the control of a stored program: output data is driven into execution pipeline 118 via output data path ($D_{OUT}$) 130. A register file 114 address from which output data can be read is sent from control logic 124 via a read address path ($R_D A_{DDR}$) 208.

Memory 122 can receive data from output data path 128 via path 210. For example, setup data may cause a program to be loaded into memory 122. Memory 122 can also connect to program counter 126 via path 146. Path 146 can be used as a read address path ($R_DA_{DDR}$) (e.g., during run mode) or a write address path ($W_RA_{DDR}$) (e.g., during setup mode). Data can be sent from memory 122 to control logic 124 via output data path ($D_{OUT}$) 144.

Program counter 126 is preferably used to access appropriate locations in memory 122. A value in program counter 126 can be sent to memory 122 via path 146. The value in program counter 126 is either incremented by or replaced with a new counter address from control logic 124 via data path 150.

Figure 3:
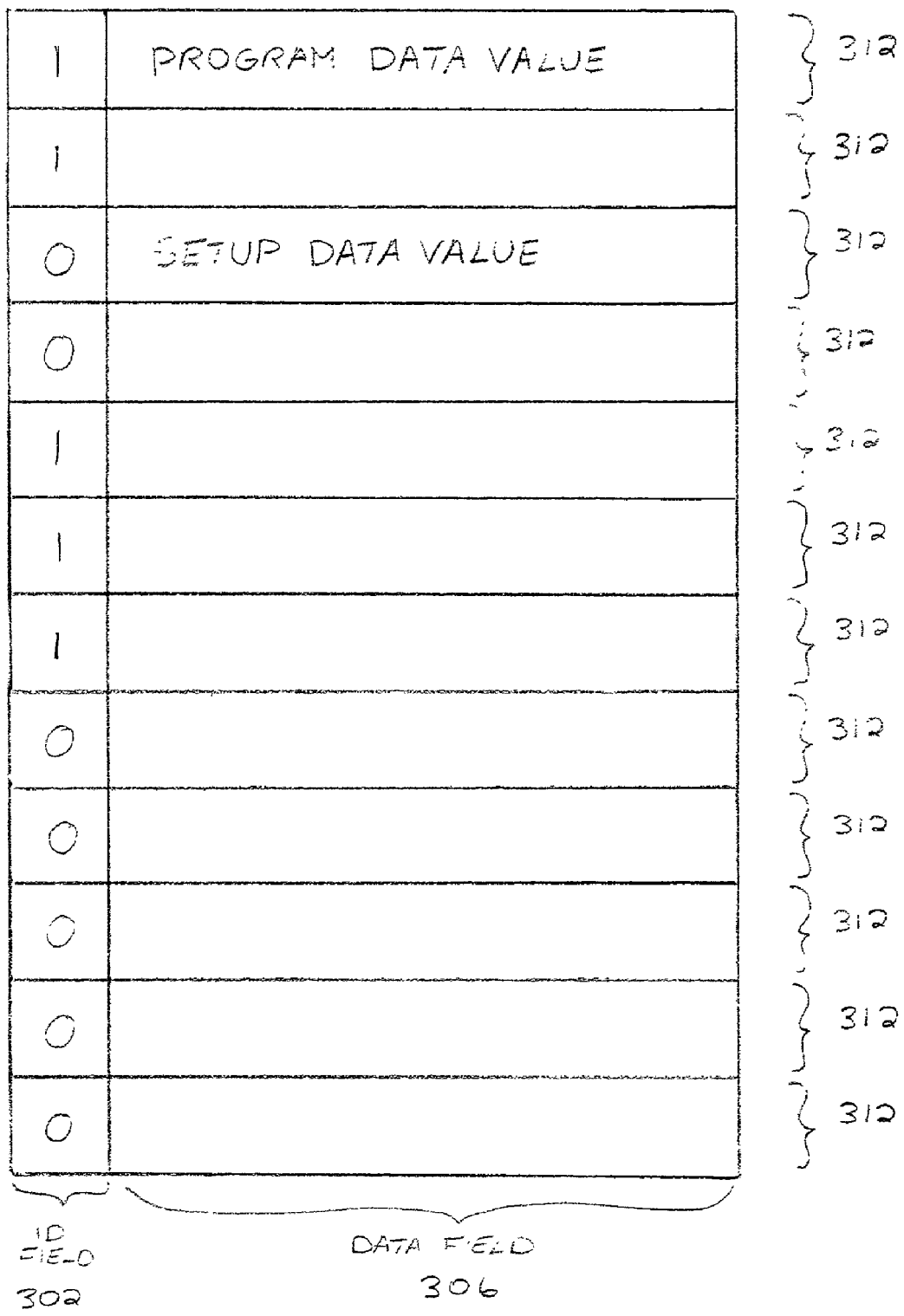
FIG. 3 is an illustration of a sample input data stream in accordance with the present invention.

FIG. 3 illustrates a sample input data stream 300. Input data stream 300 includes multiple pieces of input data 312. Each piece of input data 312 preferably contains an identification field 302, which is one or more bits, and a data field 306, which contains either program data or setup data. An identification bit of "0" may indicate, for example, setup data (setup mode), while an identification bit of "1" may indicate program data (run mode).

A piece of input data that is identified as setup data can be decoded further either from additional identification bits 302 or from some subset of the input data itself. This allows each piece of input data to contain both a setup data value and a setup program instruction. The sequence of input data values that are identified as setup data act as the instruction sequence of the setup program, which is executed by the control logic in setup mode.

The instructions of the setup program perform several important functions. One function is loading a program counter (PC) with a program memory address. The PC value is preferably supplied on the input data path. A second function is loading memory. A set of instructions are supplied on the input data path, and each instruction is loaded into memory at the current PC value. The PC is then incremented before a next instruction is loaded. A third function is loading a register file counter. The counter value can be supplied on the input data path. A fourth function is loading the register file. A value supplied on the input data path is loaded into the register file at the current value of the register file counter. The register file counter is then incremented before a next value is loaded.

When any setup instruction is executed by control logic, the associated input data is propagated through the execution pipeline via execution of a "pass-through" instruction. When the data reaches the output data path (which is the same data as that on the input data path), control logic generates the appropriate control signals to load the data in the appropriate storage location. While the system is in setup mode, it may be necessary to inhibit exceptions, such as interrupts, because the system may be in a transitory state and therefore unable to process them.

Figure 4:
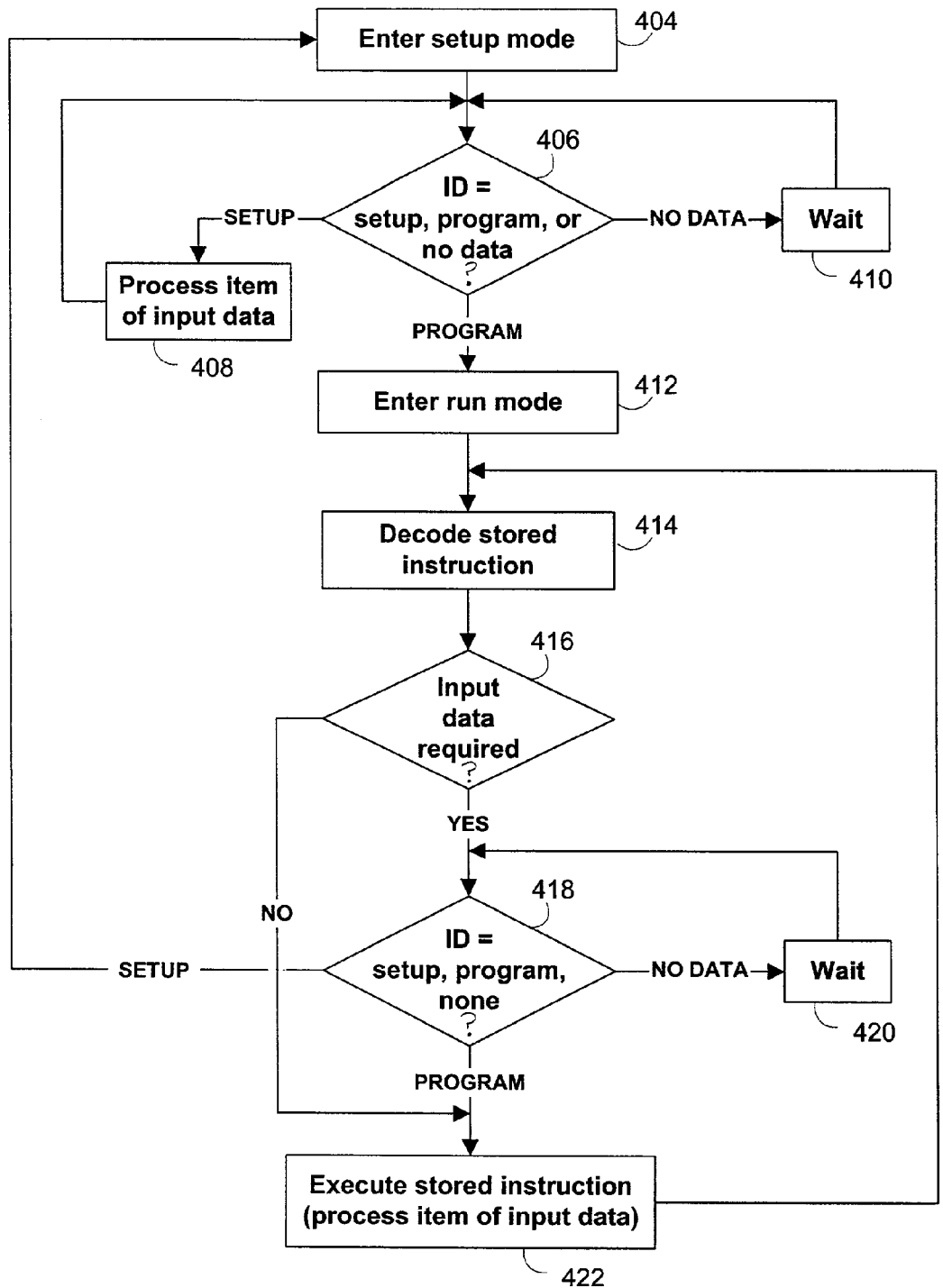
FIG. 4 is a flow diagram illustrating the processing of program and setup data in a single input data path processing engine in accordance with the present invention.
Figure 1:
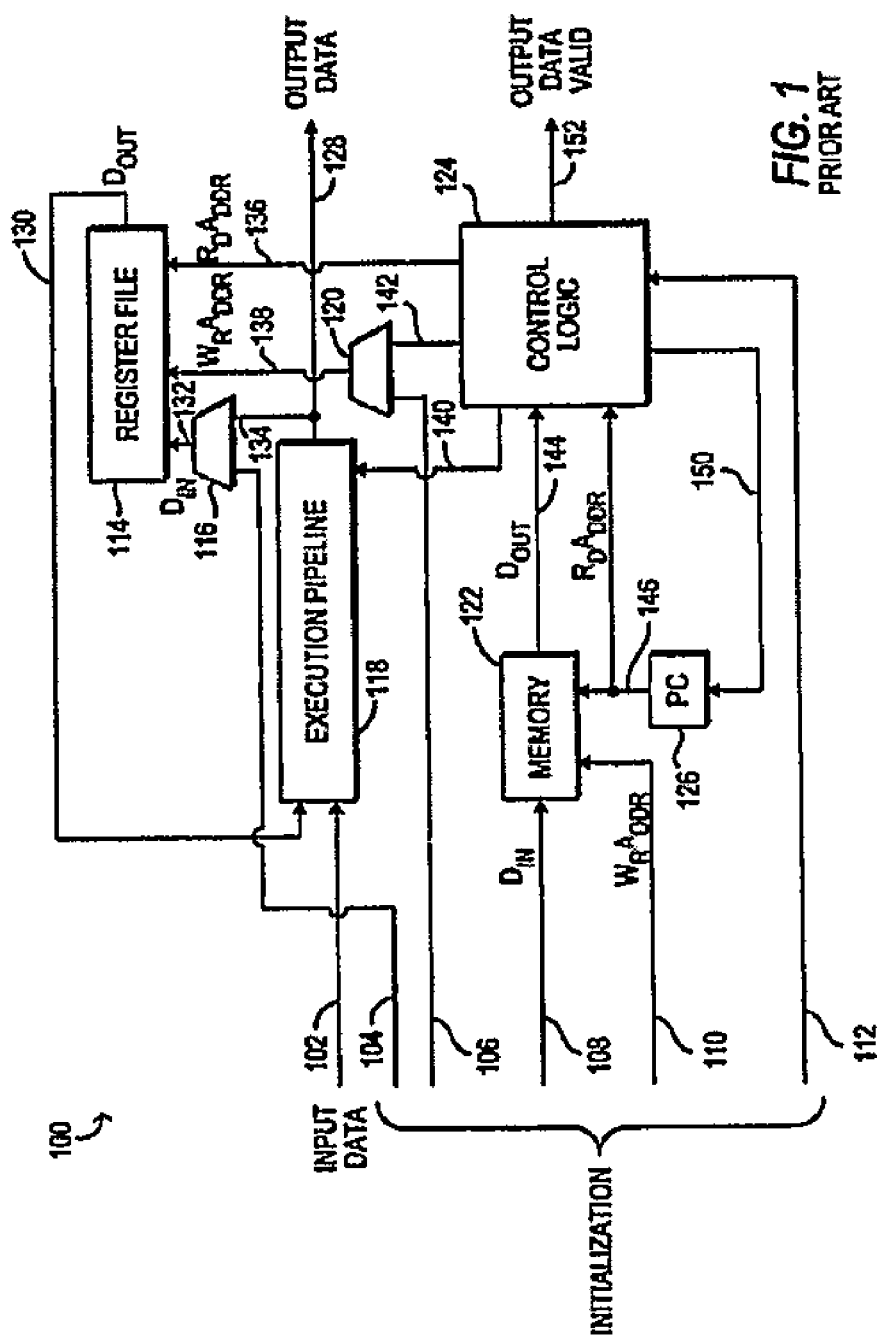
Figure 2:
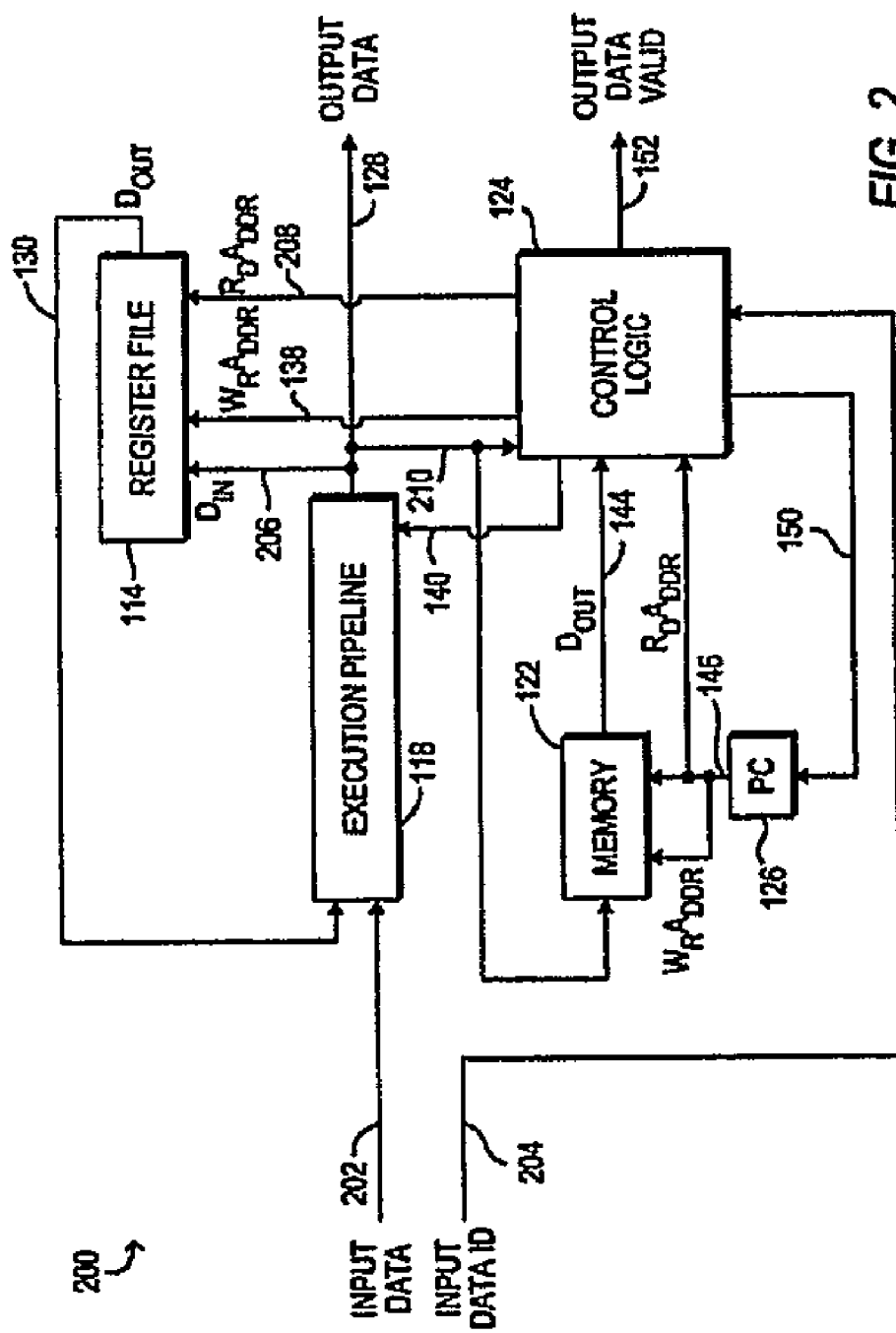
Figure 3:
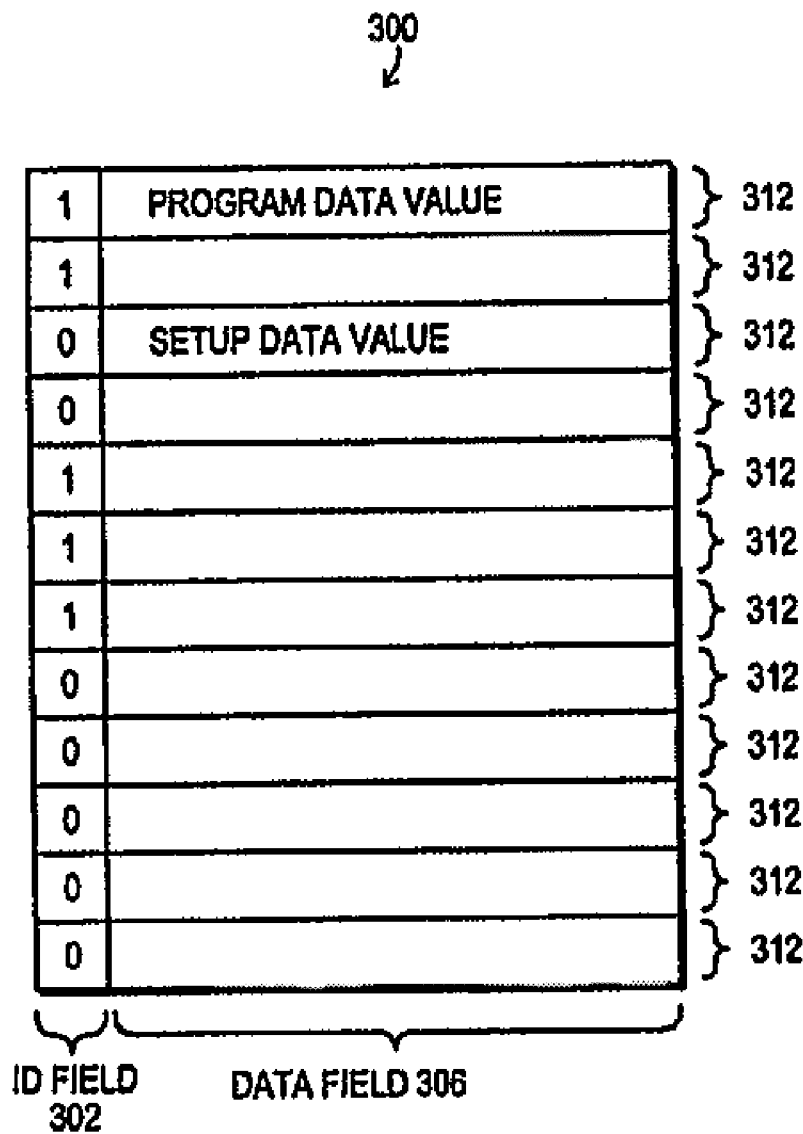
Figure 4:
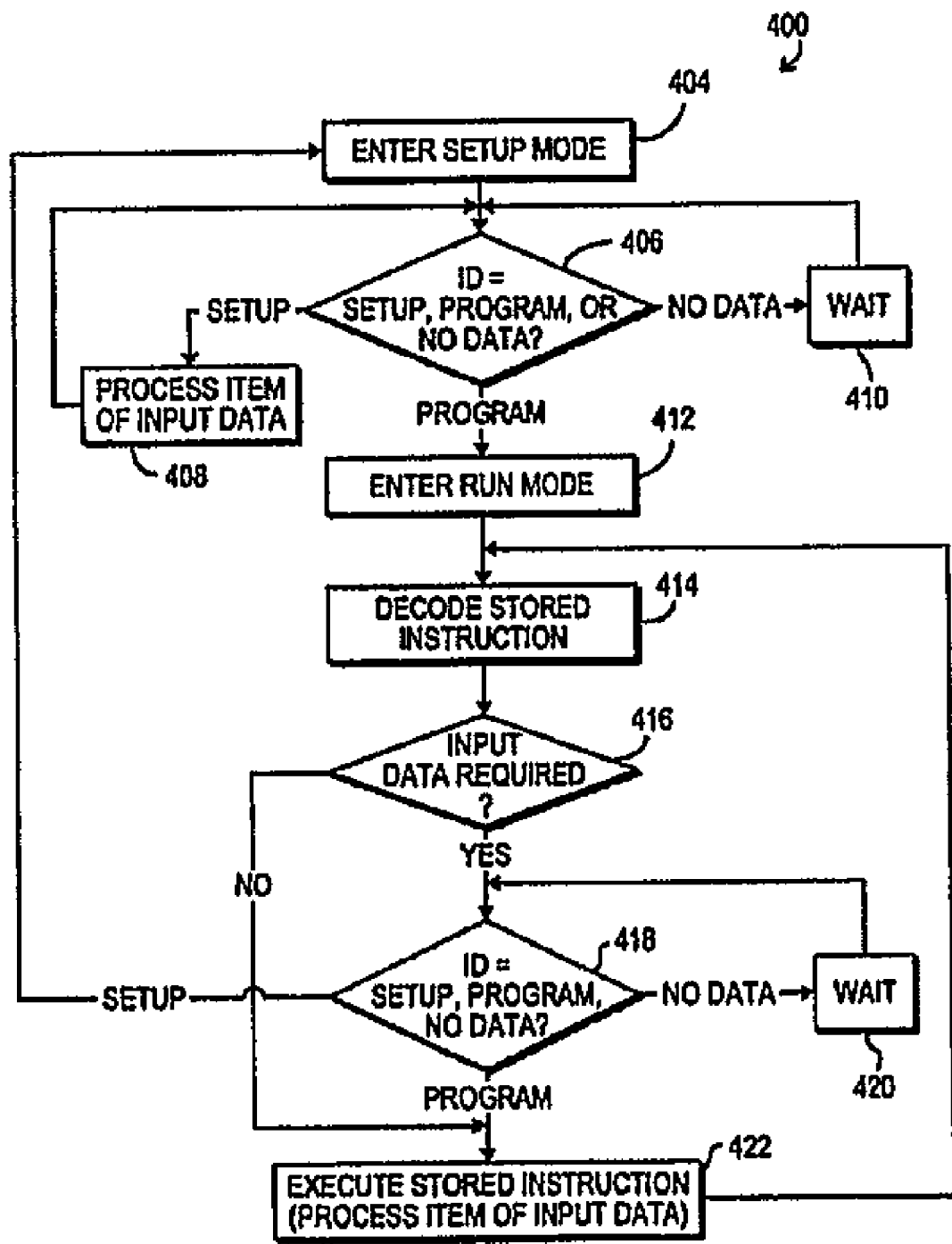
Figure 1:
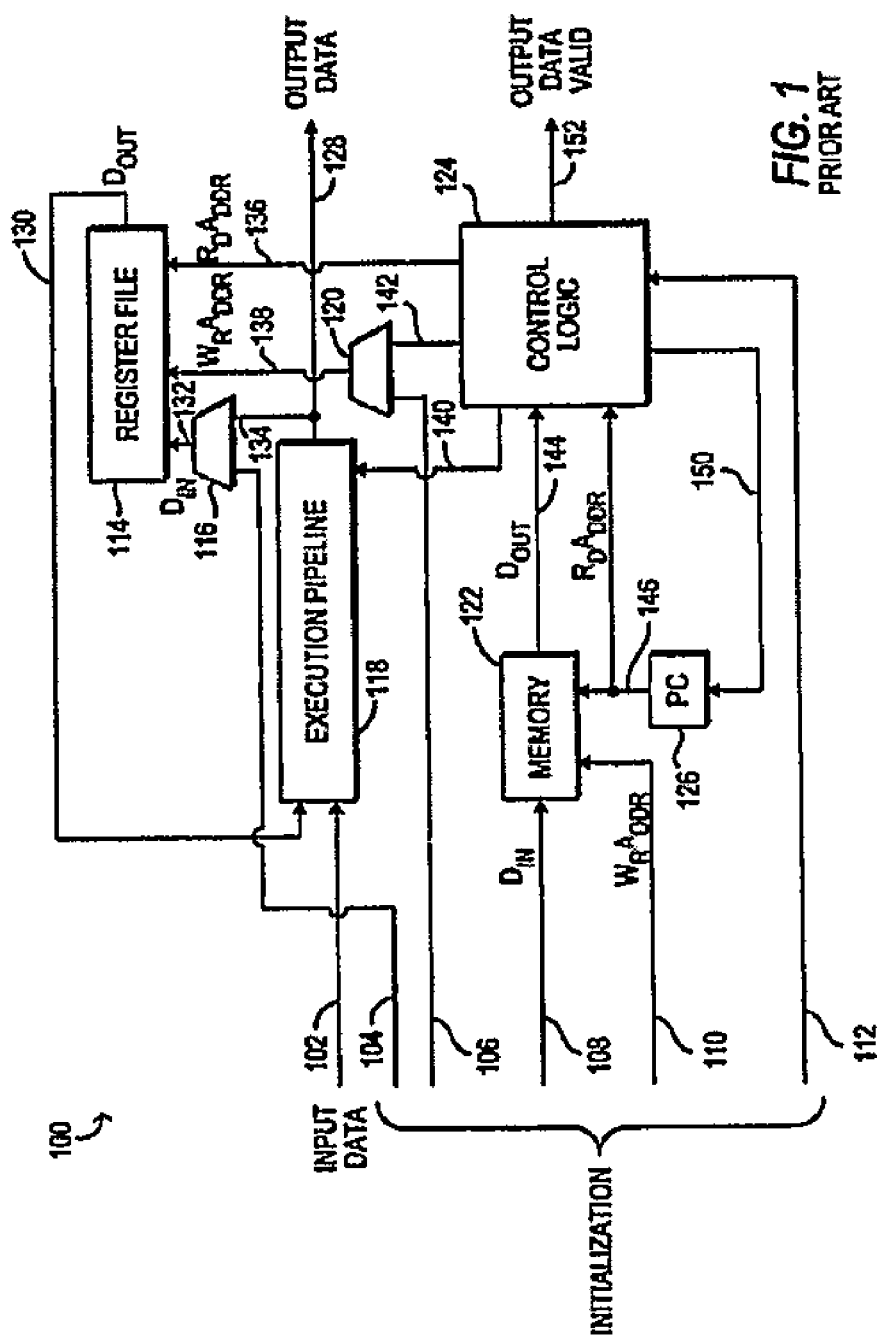
Figure 2:
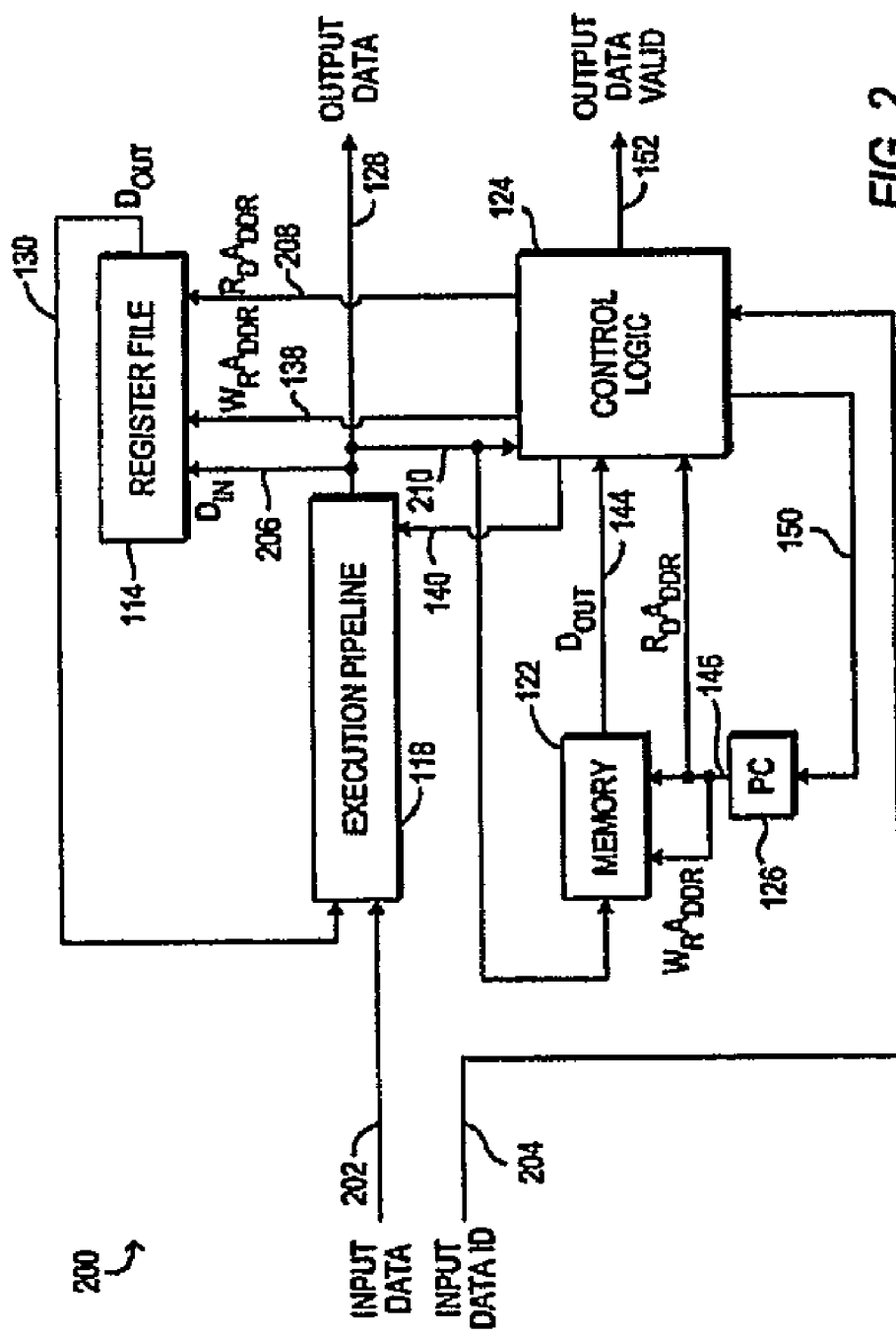
Figure 3:
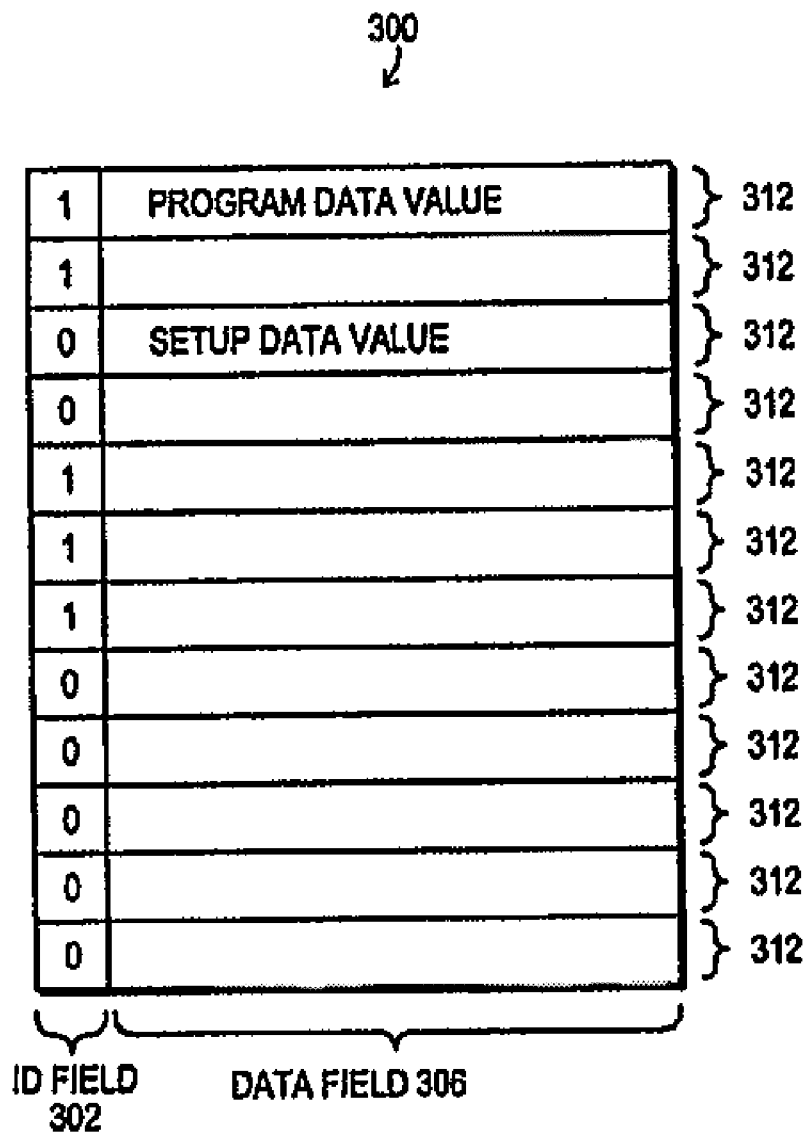
Figure 4:
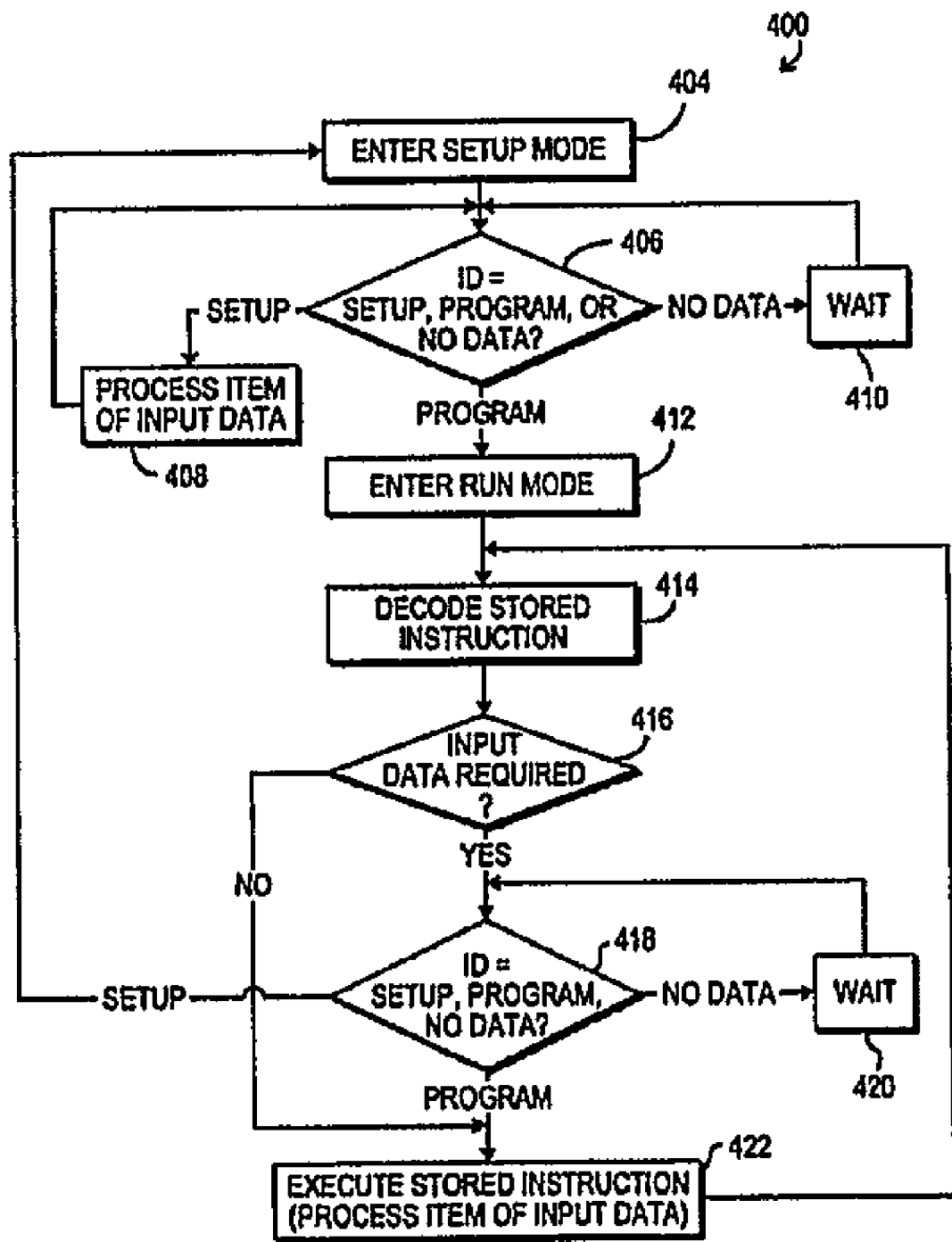

FIG. 4 illustrates the processing of program and setup data in a single input data path processing engine. Process 400 begins after the system has been reset. Because the "setup program" has little or no dependence upon the state of the processing engine at the time the setup program begins to execute, it can be used to set the initial state of the system. At step 404, the system enters setup mode. At step 406, process 400 determines whether a piece of input data is available, and if so, checks the identification bit. When the identification bit indicates setup data, process 400 moves to step 408 to process that piece of input data. When the piece of input data has been processed, process 400 moves back to step 406 to check for a next piece of input data. If no data is detected, process 400 moves to step 410, where the system waits in its current mode until a next piece of data is available.

When the identification bit indicates program data, process 400 moves to step 412 where the system enters run mode. Process 400 then moves to step 414 where it decodes a stored instruction at the current value of the program counter (PC). At step 416, process 400 determines if the decoded instruction requires any input data. If the instruction does not require input data, process 400 moves to step 422, where the processing engine executes the instruction and updates the PC (but does not process any input data). If the execution of an instruction requires input data, process 400 moves to step 418. At step 418, process 400 examines the identification bit of a next piece of input data. If the piece of input data is program data, process 400 moves to step 422 where the instruction is executed, the PC is updated, and the input data is processed. Process 400 then moves back to step 414. If data is not available, process 400 moves to step 420 where the system waits in its current mode. If the identification bit indicates setup data, process 400 moves back to step 404 without executing the decoded instruction.

Thus, process 400 can run continuously, with the processing engine automatically switching between setup mode and run mode each time a change in identification bits is detected. In run mode, the processing engine executes instructions that are read from memory. In setup mode, control logic executes the setup program, which may make use of instructions and operations not available in run mode.

The single input data path processing engine of the present invention has several advantages. Foremost, initialization information passes through a single data path. All programs, constants, and program data can be pre-processed into a single data stream, requiring no external control logic to manage the flow of data. Arranging the input data into a single data stream allows self-synchronization. A new program will not be loaded until all the data from a previous program (which precedes it in the data stream) has been processed by that previous program. Input data is analogous to the output of a first-in-first-out (FIFO) system. The source of the input data advantageously can be in a separate timing domain or can supply data at a sporadic rate without compromising the synchronization between the different pieces of program data and setup data in the input data stream. Both control logic and data paths are simplified by reusing functions that exist for normal operation. For instance, control logic already has the ability to write to the register file and the program counter. Because data required for state changes passes down the execution pipeline, it remains ordered with respect to program data. This allows state changes to be pipelined, avoiding the inefficiency of draining the execution pipeline. Finally, the instructions of the setup program advantageously do not reduce the opcode space available to normal programs because these instructions are only available in setup mode. Because setup data and program data are sent to the execution pipeline as separate pieces of input data, the number of bits representing setup data and program data can be customized.

Additional features or variations of the basic processing engine are also included in other embodiments of the present invention. For example, instead of reserving an identification field in the input data, one or more values that cannot normally occur in input data can be decoded and used to initiate the transition from run mode to setup mode. The same or a different value can be decoded and used to initiate the transition from setup mode to run mode.

Also, instead of the described setup program which can include a number of different instructions along with the input data, a simple system according to the invention may require only a single instruction or a single inflexible sequence. The mode change from run mode to setup mode can be sufficient to trigger the execution of a "hard wired" instruction or setup program by the control logic.

Alternatively, a system may require a highly complex setup program. In this case, the program according to the present invention can be stored in a separate read-only memory (ROM) and executed under the control of a dedicated setup program counter. This operation is similar to the behavior of a multi-threaded processor.

A "setup program" instruction can also be provided that propagates an input value straight through the execution pipeline to the output data path. This requires the addition of output data ID signals generated by control logic in accordance with the current operation mode. This allows appropriately tagged values to exist in the input data stream arbitrarily interleaved with program data. These special data values reach the output in a way that is asynchronous (relative to program execution), but have a pre-defined ordering relative to computed output values. Additional outputs from control logic, which are valid at the same time as the output data valid signal, can indicate whether a piece of output data is a value generated by the execution pipeline or propagated through the pipeline by a setup program.

Thus it is seen that a processing engine is provided for loading code, data, and control information through a single input data path with less complex hardware. One skilled in the art will appreciate that the present invention can be practiced by other than the described embodiments, which are presented for purposes of illustration and not of limitation, and the present invention is limited only by the claims which follow.

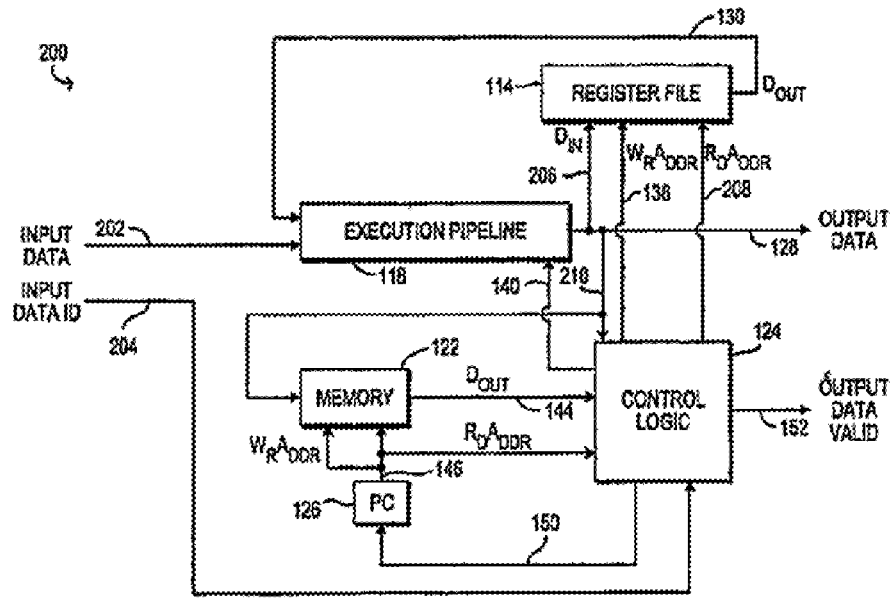

We claim:

1. A method of loading program code, data, and control information into a processing engine, said method comprising:
    receiving said program code, said data, and said control information via a single input data path, said program code, said data, and said control information including identification bits;
    reading an identification bit received via said input data path, said identification bit indicating one of setup data and program data;
    processing setup data received via said input data path by executing a pass-through instruction that causes said setup data to propagate through an execution pipeline without modification in accordance with said identification bit indicating setup data; and
    processing program data received via said input data path in accordance with said identification bit indicating program data.

2. The method of claim 1 wherein said receiving said program code, said data, and said control information comprises receiving pieces of program code, data, and control information, wherein each said piece includes said identification bit and at least one instruction corresponding to said identification bit.

3. The method of claim 1 wherein said reading an identification bit further comprises reading an identification bit corresponding to setup data.

4. The method of claim 1 wherein said processing setup data comprises:
    identifying a piece of storage in said processing engine, wherein said piece of storage is one of a register file, a memory, and a program counter; and
    supplying a value to be stored in said piece of storage.

5. The method of claim 1 wherein said processing setup data comprises:
    loading a memory address of a first instruction of a program; and
    loading said program in a block of memory, wherein said loading includes storing a set of instructions in sequential order beginning with said first instruction at said memory address and incrementing said memory address for each subsequent instruction.

6. The method of claim 1 wherein said processing setup data comprises:
    loading a value into a register file counter;
    loading a constant at said value; and
    incrementing said register file counter for loading a second constant.

7. The method of claim 1 wherein said reading an identification bit further comprises reading an identification bit corresponding to program data.

8. The method of claim 1 wherein said processing program data comprises:
    fetching an instruction of a program at a memory address;
    decoding said instruction;
    executing said instruction; and
    storing a result from said executing said instruction.

9. The method of claim 8 further comprising incrementing said memory address to fetch a second instruction.

10. The method of claim 1 further comprising propagating an input value from said single input data path through said execution pipeline to an output data path without said input value being changed.

11. The method of claim 10 further comprising generating output data identification signals to allow said input value to be interleaved with said data.

12. A method of loading setup data and program data into a computer processing engine, said method comprising:
    receiving said setup data and said program data in a single input data stream, said setup data and said program data each including pieces of input data;
    providing identification of each piece of input data to indicate whether said piece of input data is setup data or program data;
    automatically switching said processing engine from setup mode to run mode when said identification indicates program data after a most recent prior identification had indicated setup data; and
    automatically switching said processing engine from run mode to setup mode when said identification indicates setup data after a most recent prior identification had indicated program data, further comprising processing setup data by executing a pass-through instruction that causes said setup data to propagate through an execution pipeline without modification.

13. The method of claim 12 wherein each piece of input data includes an instruction sequence for one of setup data and program data.

14. The method of claim 12 wherein said automatically switching said processing engine from setup mode to run mode further comprises processing program data by executing a stored instruction sequence.

15. The method of claim 12 further comprising waiting in one of a setup mode or run mode until a next said piece of input data is received.

16. A data processing engine comprising:
a single input data path for receiving information that includes program data and setup data;
an execution pipeline coupled to said input data path that performs arithmetic and logic operations; and
control logic coupled to said execution pipeline that determines whether information received on said input data path is setup data or program data, wherein when said control logic determines that said information is setup data, said execution pipeline executes a pass-through instruction allowing setup data to propagate through said execution pipeline without modification.

17. The data processing engine of claim 16 wherein said information comprises pieces of input data, each piece of input data including one of:
a setup identification bit and said setup data; and
a program identification bit and said program data.

18. The data processing engine of claim 16 further comprising an input data identification path coupled to said control logic that transports setup and program identification bits.

19. The data processing engine of claim 18 wherein said execution pipeline executes said pass-through instruction when said control logic reads a setup identification bit received via said input data identification path.

20. The data processing engine of claim 18 wherein said execution pipeline processes said program data when said control logic reads a program identification bit received via said input data identification path.

21. The data processing engine of claim 16 further comprising an input data identification path coupled to said control logic that transports identification bits indicating either setup data or program data, wherein said control logic reads an identification bit received via said input data identification path and determines whether said identification bit indicates setup data or program data.

22. A computer processing engine comprising:
an execution pipeline comprising:
a first input coupled to receive setup data and program data from the same input data path,
a second input, and
an output, wherein when said first input receives setup data, said execution pipeline executes a pass-through instruction allowing said setup data to propagate through said execution pipeline to said output without modification;
a memory comprising:
a first input coupled to said output of said execution pipeline,
a second input, and
an output;
a program counter comprising:
an input, and
an output coupled to said input of said memory;
control logic comprising:
a first input coupled to said output of said execution pipeline,
a second input coupled to said output of said memory,
a third input coupled to said output of said program counter,
a first output coupled to said program counter input, and
a second output; and
a register file comprising:
a first input coupled to said output of said execution pipeline,
a second input coupled to said second output of said control logic, and
an output coupled to said second input of said execution pipeline.

23. The computer processing engine of claim 22 wherein said execution pipeline performs arithmetic and logic operations.

24. The computer processing engine of claim 22 wherein said first input of said memory receives a set of instructions when data from said input data path is setup data.

25. The computer processing engine of claim 22 wherein said second input of said memory is coupled to receive a memory address from said program counter when data from said input data path is setup data.

26. The computer processing engine of claim 22 wherein said input of said program counter is coupled to receive a memory address from said control logic.

27. The computer processing engine of claim 22 wherein said output of said program counter comprises a memory address, said memory address comprising a write memory address when data from said input data path is setup data and a read memory address when data from said input data path is program data.

28. The computer processing engine of claim 22 wherein said control logic further comprises a fourth input coupled to receive an identification bit from an input data identification data path, said identification bit indicating whether data from said input data path is setup data or program data.

29. The computer processing engine of claim 22 wherein said control logic:
sends an instruction to said execution pipeline;
sends to said register file an address to read data from; and
sends to said register file an address to write data to.

30. The computer processing engine of claim 22 wherein said first input of said register file is coupled to receive a result from an arithmetic or logic operation performed by said execution pipeline.

31. Apparatus for loading program code, data, and control information into a processing engine, said apparatus comprising:
means for receiving said program code, said data, and said control information via a single input data path, said program code, said data, and said control information including identification bits;
means for reading an identification bit received via said input data path, said identification bit indicating one of setup data and program data;
means for processing setup data received via said input data path by executing a pass-through instruction that causes said setup data to propagate through an execution pipeline without modification in accordance with said identification bit indicating setup data; and
means for processing program data received via said input data path in accordance with said identification bit indicating program data.

32. Apparatus for loading setup data and program data into a computer processing engine, said apparatus comprising:
means for receiving said setup data and said program data in a single input data stream, said setup data and said program data each including pieces of input data;
means for providing identification of each piece of input data to indicate whether said piece of input data is setup data or program data;

means for automatically switching said processing engine from setup mode to run mode when said identification indicates program data; and means for automatically switching said processing engine from run mode to setup mode when said identification indicates setup data, further comprising means for processing setup data by executing a pass-through instruction that causes said setup data to propagate through an execution pipeline without modification.

33. A data processing engine comprising:
a single input data path means for receiving information that includes program data and setup data;
execution pipeline means coupled to said input data path means for performing arithmetic and logic operations; and
control logic means coupled to said execution pipeline means for determining whether information received on said input data path means is setup data or program data, wherein when said control logic means determines that said information is setup data, said execution pipeline means executes a pass-through instruction allowing setup data to propagate through said execution pipeline means without modification.

34. A computer processing engine comprising:
execution pipeline means for performing arithmetic and logic operations, said execution pipeline means comprising:
 a first input coupled to receive setup data and program data from the same input data path,
 a second input, and
 an output, wherein when said first input receives setup data, said execution pipeline means executes a pass-through instruction allowing said setup data to propagate through said execution pipeline means to said output without modification;

memory means comprising:
 a first input coupled to said output of said execution pipeline means,
 a second input, and
 an output;
program counter means comprising:
 an input, and
 an output coupled to said input of said memory means;
control logic means for determining whether information received on said input data path means is setup data or program data, said control logic means comprising:
 a first input coupled to said output of said execution pipeline means,
 a second input coupled to said output of said memory means,
 a third input coupled to said output of said program counter means,
 a first output coupled to said program counter means input, and
 a second output; and
register file means for providing input data to said execution pipeline means and for storing output data from said execution pipeline means, said register file means comprising:
 a first input coupled to said output of said execution pipeline means,
 a second input coupled to said second output of said control logic means, and
 an output coupled to said second input of said execution pipeline means.

* * * * *

UNITED STATES PATENT AND TRADEMARK OFFICE
CERTIFICATE OF CORRECTION

PATENT NO.      : 6,983,360 B2
APPLICATION NO. : 09/943586
DATED           : January 3, 2006
INVENTOR(S)     : Thomas J. Kenney It is certified that error appears in the above-identified patent and that said Letters Patent is hereby corrected as shown below:

Replace informal drawing sheet 1 with the attached formal drawing sheet 1.

Replace informal drawing sheet 2 with the attached formal drawing sheet 2.

Replace informal drawing sheet 3 with the attached formal drawing sheet 3.

FIG. 4, decision box 418, change "none" to -- no data --.

Replace informal drawing sheet 4 with the attached formal drawing sheet 4.

Signed and Sealed this

Eighteenth Day of September, 2007

JON W. DUDAS
*Director of the United States Patent and Trademark Office*

UNITED STATES PATENT AND TRADEMARK OFFICE
CERTIFICATE OF CORRECTION

PATENT NO.         : 6,983,360 B2
APPLICATION NO. : 09/943586
DATED              : January 3, 2006
INVENTOR(S)       : Neal Andrew Crook et al.

It is certified that error appears in the above-identified patent and that said Letters Patent is hereby corrected as shown below:

Delete the title page and substitute therefor the attched title page.

Replace informal drawing sheet 1 with the attached formal drawing sheet 1.

Replace informal drawing sheet 2 with the attached formal drawing sheet 2.

Replace informal drawing sheet 3 with the attached formal drawing sheet 3.

FIG. 4, decision box 418, change "none" to -- no data --.

Replace informal drawing sheet 4 with the attached formal drawing sheet 4.

This cetificate supersedes Certificate of Correction issued September 18, 2007.

Signed and Sealed this

Twenty-third Day of October, 2007

JON W. DUDAS
*Director of the United States Patent and Trademark Office*

(12) United States Patent
Crook et al.

(10) Patent No.: US 6,983,360 B2
(45) Date of Patent: Jan. 3, 2006

(54) PROGRAM LOADING MECHANISM THROUGH A SINGLE INPUT DATA PATH

(75) Inventors: Neal Andrew Crook, Reading (GB); James Peterson, Portland, OR (US)

(73) Assignee: Micron Technology, Inc., Boise, ID (US)

(*) Notice: Subject to any disclaimer, the term of this patent is extended or adjusted under 35 U.S.C. 154(b) by 737 days.

(21) Appl. No.: 09/943,586

(22) Filed: Aug. 30, 2001

(65) Prior Publication Data
US 2003/0046523 A1 Mar. 6, 2003

(51) Int. Cl.
G06F 9/445 (2006.01)
G06F 9/24 (2006.01)

(52) U.S. Cl. .................... 712/229; 712/225; 712/227
(58) Field of Classification Search ............ 712/225, 712/227, 229; 717/177, 178; 709/221, 222; 710/10, 14; 380/249
See application file for complete search history.

(56) References Cited
U.S. PATENT DOCUMENTS

| | | | | |
|---|---|---|---|---|
| 5,652,887 A | * | 7/1997 | Dewey et al. | 719/325 |
| 5,689,726 A | * | 11/1997 | Lin | 710/10 |
| 5,968,169 A | * | 10/1999 | Pickett | 712/239 |
| 6,110,229 A | * | 8/2000 | Yamaguchi | 717/178 |
| 6,324,691 B1 | * | 11/2001 | Gazdik | 717/178 |

* cited by examiner

Primary Examiner—Daniel H. Pan
(74) Attorney, Agent, or Firm—Fish & Neave IP Group of Ropes & Gray LLP; Evelyn C. Mak

(57) ABSTRACT

Pieces of input data, which can be either setup data or program data with an associated identifier, are provided to a processing engine through a single input data path. After a system initially resets, the processing engine runs in setup mode. When an identifier for setup data is detected, input data is passed unchanged through an execution pipeline to control logic, which executes a setup program. The setup program loads a program counter, a memory, a register file counter, and a register file. When an identifier for program data is detected, the processing engine automatically switches to run mode and input data is processed in the execution pipeline. The processing engine automatically switches between run mode and setup mode depending on the identifier. Using a single input data path decreases hardware complexity and allows input data to be processed without external control logic.

34 Claims, 4 Drawing Sheets